United States Patent
Soreyn et al.

(10) Patent No.: US 11,047,524 B2
(45) Date of Patent: Jun. 29, 2021

(54) MODULAR SUPPORT FRAME FOR LED PANELS AND LED WALL COMPRISING SUCH A SUPPORT FRAME

(71) Applicant: TWENTY THREE BVBA, Izegem (BE)

(72) Inventors: Kristof Maurice Soreyn, Izegem (BE); Andy Daniel Demeulenaere, Kortrijk (BE)

(73) Assignee: TWENTY THREE BVBA

( * ) Notice: Subject to any disclaimer, the term of this patent is extended or adjusted under 35 U.S.C. 154(b) by 0 days.

(21) Appl. No.: 16/767,605

(22) PCT Filed: Nov. 5, 2018

(86) PCT No.: PCT/IB2018/058660
§ 371 (c)(1),
(2) Date: May 28, 2020

(87) PCT Pub. No.: WO2019/111075
PCT Pub. Date: Jun. 13, 2019

(65) Prior Publication Data
US 2020/0370705 A1    Nov. 26, 2020

(30) Foreign Application Priority Data

Dec. 6, 2017    (BE) .................................. 2017/5908

(51) Int. Cl.
| | |
|---|---|
| *F16M 11/22* | (2006.01) |
| *F16M 11/34* | (2006.01) |
| *F21V 21/116* | (2006.01) |
| *F21V 21/22* | (2006.01) |
| *F21Y 115/10* | (2016.01) |

(52) U.S. Cl.
CPC ............ *F16M 11/34* (2013.01); *F21V 21/116* (2013.01); *F21V 21/22* (2013.01); *F21Y 2115/10* (2016.08)

(58) Field of Classification Search
CPC .............................. F16M 11/34; F16M 11/245
USPC ........................................................ 362/413
See application file for complete search history.

(56) References Cited

U.S. PATENT DOCUMENTS

| | | | | |
|---|---|---|---|---|
| 3,564,789 | A * | 2/1971 | Vyvyan et al. | E04C 3/005 52/108 |
| 5,085,018 | A * | 2/1992 | Kitamura | E04H 12/187 52/108 |
| 5,383,099 | A * | 1/1995 | Peters | G03B 15/06 362/18 |

(Continued)

FOREIGN PATENT DOCUMENTS

| | | |
|---|---|---|
| DE | 202011107275 U1 | 1/2012 |
| DE | 202017103382 U1 | 6/2017 |

OTHER PUBLICATIONS

Search Report for International Patent Application PCT/IB2018/058660, dated Jun. 13, 2019.

*Primary Examiner* — Christopher M Raabe
(74) *Attorney, Agent, or Firm* — Fresh IP PLC; Clifford D. Hyra; Aubrey Y. Chen (57) ABSTRACT

A modular support frame (1) for supporting LED panels (2), comprising several frame modules (3), wherein at least one of these frame modules (3) is configured to support an LED panel (2), and comprises at least one longitudinal rod (4, 5) of a fixed length which is at least partially double-walled, and an LED wall (26) comprising such a support frame (1).

19 Claims, 6 Drawing Sheets

(56) References Cited

U.S. PATENT DOCUMENTS

| | | | |
|---|---|---|---|
| 5,873,312 A | 2/1999 | Mauro-Vetter | |
| 7,354,180 B2 * | 4/2008 | Sawhney | G09F 9/33 |
| | | | 362/238 |
| 8,303,143 B2 * | 11/2012 | Webb | F21V 21/22 |
| | | | 362/413 |
| 9,543,634 B1 | 1/2017 | Bailey et al. | |
| 10,012,368 B2 | 7/2018 | Patterson et al. | |
| 2007/0001927 A1 * | 1/2007 | Ricks | G09F 9/3026 |
| | | | 345/1.1 |
| 2008/0263924 A1 * | 10/2008 | Nearman | G09F 15/0056 |
| | | | 40/607.13 |
| 2013/0119207 A1 | 5/2013 | Troy | |
| 2013/0271940 A1 * | 10/2013 | Cope | H04N 5/64 |
| | | | 361/809 |
| 2015/0206454 A1 * | 7/2015 | O'Neill | G09B 23/12 |
| | | | 434/126 |

* cited by examiner

MODULAR SUPPORT FRAME FOR LED PANELS AND LED WALL COMPRISING SUCH A SUPPORT FRAME

The present invention relates to a modular support frame for supporting LED panels, comprising several frame modules, wherein at least one of these frame modules is configured to support an LED panel, and comprises at least one longitudinal rod of a fixed length. In addition, the present invention relates to an LED wall comprising such a support frame.

Support frames to which the present invention relates are typically used in order to temporarily erect a wall during events, such as for example festivals, for example in the form of an LED wall. LED panels and/or other panels and/or lighting and/or electronic equipment, etc. may be attached to these support frames as decoration for such an event.

To this end, such modular support frames have to be, on the one hand, lightweight with a view to transportation and in order to be able to be erected quickly. On the other hand, they have to be sufficiently strong to be able to absorb the usual loads. When they are positioned in an outside environment, such frames have to be able, inter alia, to absorb wind loads.

In order to be able to ensure this strength, the said longitudinal rod is made of a fixed length. The fixed length of the longitudinal rod is understood to mean that this longitudinal rod is non-telescopic and therefore not retractable or extendable. Obviously, this length may be subject to variations on account of loads or weather conditions (temperature variations).

An example of such a modular support frame is described and illustrated, for example in CN 206221927 U.

It is the object of the present invention to provide such a modular support frame by means of which the stiffness of this frame and a wall erected using the latter can be increased, within the same dimensions, without the frame becoming significantly heavier to achieve this.

This object of the invention is achieved by providing a modular support frame for supporting LED panels, comprising several frame modules, wherein at least one of these frame modules is configured to support an LED panel, and comprises at least one longitudinal rod of a fixed length which is at least partially double-walled.

By now making such a longitudinal rod at least partially double-walled, it is possible to ensure that, within the same dimensions of such a support frame, this frame will bend to a lesser extent under load. A higher structural stiffness is achieved than with similar support frames without such double-walled longitudinal rods.

The inner wall of the longitudinal rod serves as a structural tension element and is therefore the most important structural element of the longitudinal rod with a view to safety. This inner wall is now additionally protected by the outer wall of the longitudinal rod. As a result thereof, an external impact will less readily damage the inner wall.

The walls of such a double-walled longitudinal rod are fixedly arranged with respect to each other in order to be able to guarantee the necessary strength.

To this end, the longitudinal rod may, more specifically, comprise an internal tube and comprise at least one external tube which is arranged around this internal tube.

Preferably, these tubes are cylindrical in this case. However, these may also have cross sections which differ from a circular cross section, such as for example a polygonal cross section.

Such an external tube may be arranged around such an internal tube in different ways. It is, for example, possible to arrange annular, cylindrical or spiral intermediate pieces between both tubes. Both tubes may, for example, be attached to the same end piece. It is possible to arrange a coupling piece around the internal tube, to which the external tube can then be attached.

Preferably, the external tube is fixed with respect to the internal tube. More specifically, the external tube may be pinned to the internal tube, for example by means of pins, for this purpose. Alternatively, both tubes may be produced together, for example by means of extrusion, to form a substantially double-walled rod.

The frame module comprising the longitudinal rod preferably comprises a second longitudinal rod which is at least partially double-walled and which is arranged at an intermediate distance from the first longitudinal rod in order to support the LED panel.

In this case, these longitudinal rods are preferably attachable on the rear side of such a panel.

These longitudinal rods are preferably mutually coupled to, for example, cross beams. These cross beams may be substantially rod-shaped, but may, for example, also be substantially plate-like and/or may be, for example, in the form of lattice girders.

The longitudinal rods and cross beams together may extend substantially in the same plane and in this case, for example, together form a frame. These longitudinal rods and cross beams may also form part of a lattice. Such a lattice may comprise additional cross bars and longitudinal rods which, together with the aforementioned longitudinal rods and cross beams, may be assembled to form a three-dimensional structure.

A frame module comprising a said first longitudinal rod and a said second longitudinal rod preferably comprises at least one first cross bar, which is pivotably attachable or attached to the first longitudinal rod, at least one second cross bar which is pivotably attachable or attached to the second longitudinal rod and a third longitudinal rod which is pivotably attached or attachable to the first cross bar and is pivotably attached or attachable to the second cross bar.

By making the cross bars and longitudinal rods pivotably attachable, it is possible to provide a foldable structure. In this case, the rods are then preferably releasably attachable and this at least at attachment points which have been well considered for this purpose. The frame module may then be folded for transportation. In order to erect a wall by means thereof, the frame module may be folded open, in which case all cross bars are attached to the respective longitudinal rods in order to form a three-dimensional structure. In the installed position, the third longitudinal rod is then situated at an intermediate distance from the first longitudinal rod and the second longitudinal rod and, for example, a panel attached to the frame module.

In a further preferred embodiment, in addition to the frame module comprising the longitudinal rods and the cross bars, at least one second frame module of the frame modules is configured to support an LED panel, wherein this second frame module comprises a first longitudinal rod, a second longitudinal rod and a third longitudinal rod, comprises at least one first cross bar which is pivotably attachable or attached to the first longitudinal rod of this second frame module and pivotably attachable or attached to the third longitudinal rod of this frame module and comprises at least one second cross bar which is pivotably attachable or attached to the second longitudinal rod of this second frame module and which is pivotably attachable to the third longitudinal rod of the former frame module comprising the longitudinal rods and the cross bars, when this former frame module is arranged adjacent to the second frame module. In this way, it is also possible to mutually couple various frame modules by means of these cross bars.

In a particularly preferred embodiment, the first longitudinal rod, at the location of every attachment to a cross bar, comprises a constriction in order to attach the cross bar, wherein this first longitudinal rod is preferably single-walled at the location of this constriction. Preferably, the construction of the second longitudinal rod is analogous. Preferably, the construction of an optional third longitudinal rod is also analogous.

In addition to the one or several attachments to a cross bar, the first longitudinal rod then preferably comprises double-walled parts, so that the cross bar is only single-walled at the location of these attachments.

With longitudinal rods which comprise a said internal tube and a said external tube, the internal tube then preferably extends over the entire length of the longitudinal rod, while various outer tubes are arranged around this internal tube and this around the parts of the internal tube which are not provided for attaching a cross bar.

In embodiments comprising a first longitudinal rod with a said internal tube and at least one said external tube, at the location of every attachment to a cross bar at the location of a constriction, a coupling piece is preferably arranged around the internal tube of the first longitudinal rod for attaching this cross bar to this first longitudinal rod. Each external tube of this first longitudinal rod is then preferably attached to the internal tube by means of a same said coupling piece.

Preferably, each second longitudinal rod is also constructed in an analogous way. Each third longitudinal rod may also be constructed in an analogous way.

The first cross bars of a frame module according to the present invention with such first cross bars are preferably arranged at such an intermediate distance apart that they, together with the first longitudinal rod and the third longitudinal rod, form a ladder.

Preferably, several frame modules of the said frame modules comprise at least one longitudinal rod and longitudinal rods of different frame modules are respectively mutually couplable in order to mutually couple adjacent frame modules. It is possible to configure first longitudinal rods so as to be mutually couplable and/or to configure second longitudinal rods so as to be mutually couplable and/or to configure third longitudinal rods so as to be mutually couplable. By mutually coupling longitudinal rods of adjacent frame modules, these frame modules can be assembled to form a strong structure. After coupling, the coupled longitudinal rods then preferably extend in line with one another.

In this case, these longitudinal rods may be mutually coupled in different ways. The longitudinal rods may, for example, be provided with a pin at a first end and a hole at a second end in order to form a pin-hole joint between similar longitudinal rods.

Alternatively, the longitudinal rods may, for example, be provided with an external screw thread at a first end and be provided with a fastening sleeve with a corresponding external screw thread at a second end in order to form a screw connection between similar longitudinal rods.

The rods of a support frame according to the present invention may be made of any kind of suitable material, this for example from metal or plastic. Preferably, at least a part of these rods is made of an aluminium or a composite comprising carbon fibres in order to be able to make the support frame particularly lightweight.

Each frame module of a support frame according to the present invention preferably comprises first attachment means and second attachment means, wherein the first attachment means of a first frame module are adjustably attachable to the second attachment means of a second adjacent frame module, so that the first frame module and the second frame module are mutually couplable at different angles with respect to each other by means of these attachment means.

Examples of such attachment means are known from, for example, CN 104299527 A, CN 204991019 U and CN 203482542 U.

By means of such attachment means, it is possible to mutually couple the support frames in such a way that these form a convex or concave wall together. LED panels which are attached thereto can then form a convex or concave LED wall together.

The object of the invention is furthermore also achieved by providing an LED wall, comprising an above-described support frame according to the present invention and several LED panels which are attached to this support frame.

The present invention will now be explained in more detail by means of the following detailed description of a few preferred support frames according to the present invention. The sole aim of this description is to give illustrative examples and to indicate further advantages and particulars of the present invention and can therefore by no means be interpreted as a limitation of the area of application of the invention or of the patent rights defined in the claims.

In this detailed description, reference numerals are used to refer to the attached drawings, in which.

Figure 1:
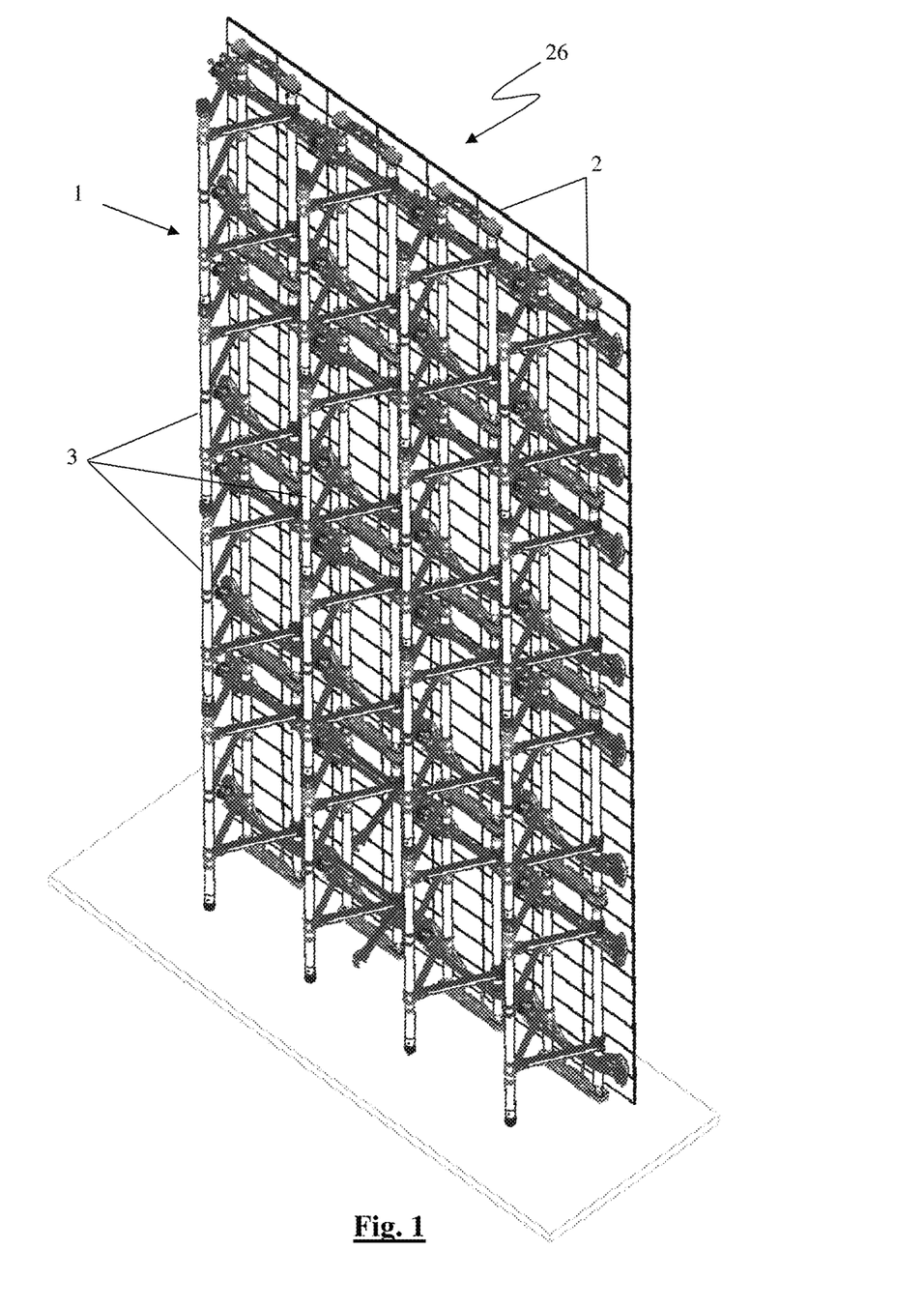
FIG. 1 shows an LED wall according to the present invention in perspective, with a view of the support frame situated behind.

The illustrated support frames (1) comprise several frame modules (3) which are each configured to support an LED panel (2). In FIG. 1, such frame modules (3) are assembled to form a support frame (1) and LED panels (2) are attached thereto which together form an LED wall (26). Alternatively or additionally, other panels and/or lighting and/or electronic equipment, etc. may also be attached to these frame modules (3). These frame modules (3) may also be left empty and be assembled as such in order to form a wall.

Each illustrated frame module (3) comprises a first longitudinal rod (4) and a second longitudinal rod (5) which are attached to a cross beam (9) at the top and at the bottom and together with these form a frame. The top cross beam (9) and the bottom cross beam (9) are configured as a substantially plate-like lattice. Between this top cross beam (9) and this bottom cross beam (9), two additional cross beams (23) are attached to the first longitudinal rod (4) and the second longitudinal rod (5). These intermediate cross beams (23) are provided, on the one hand, with attachment means for attaching the support frame (1) to the corresponding LED panel (2) and, on the other hand, with attachment means (24, 25) for laterally mutually coupling frame modules (3), as will still be explained further.

Figure 2:
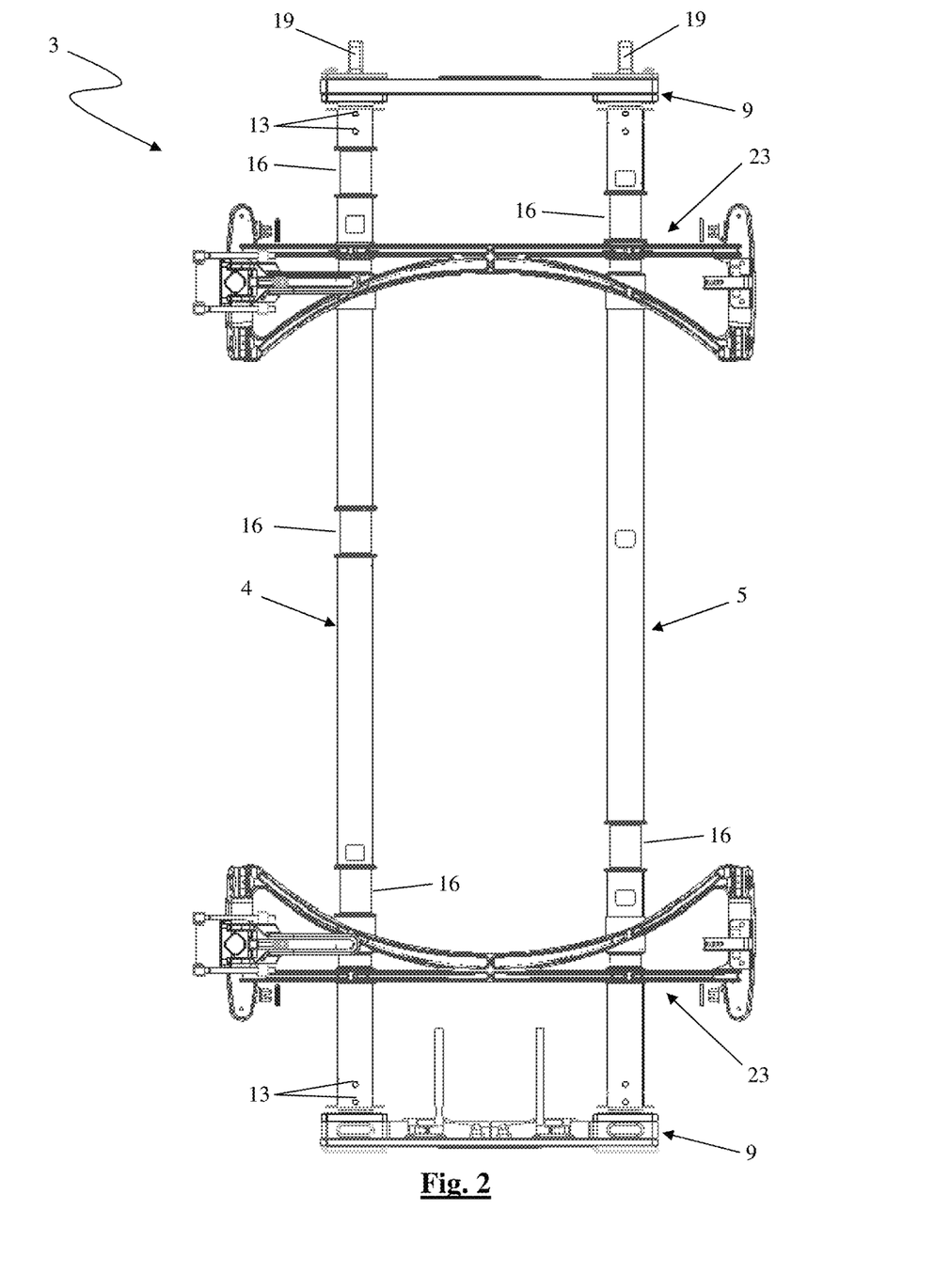
FIG. 2 shows a frame module of a support frame according to the present invention separately in front view.
Figure 3:
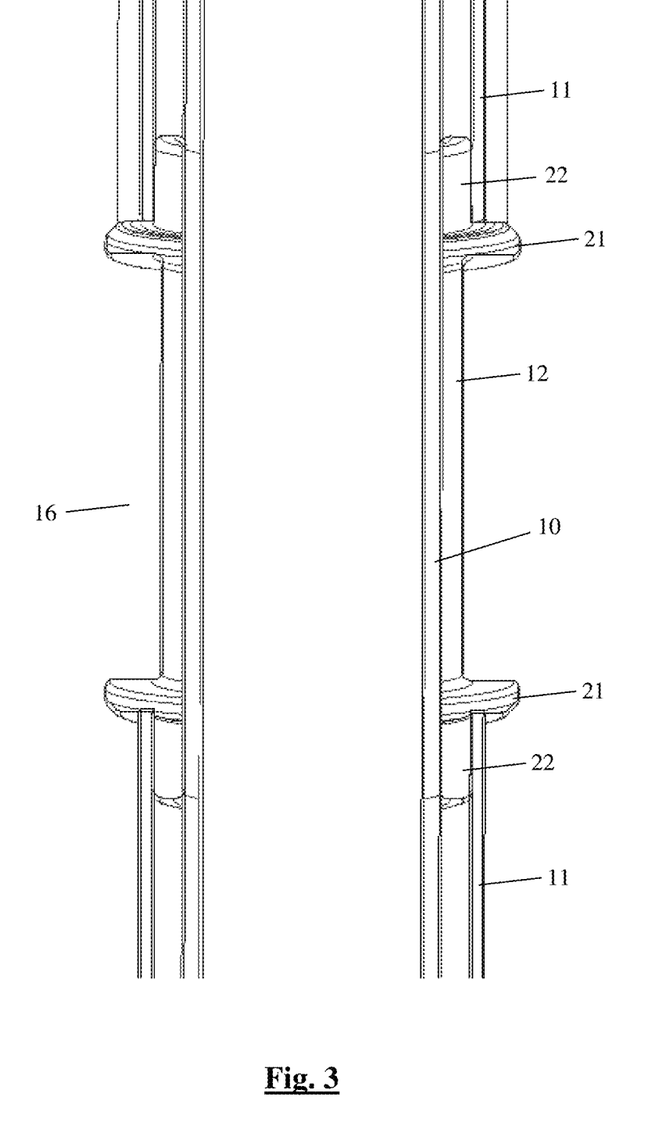
FIG. 3 shows a part of a longitudinal rod from a support frame according to the present invention in more detail in cross section.
Figure 4:
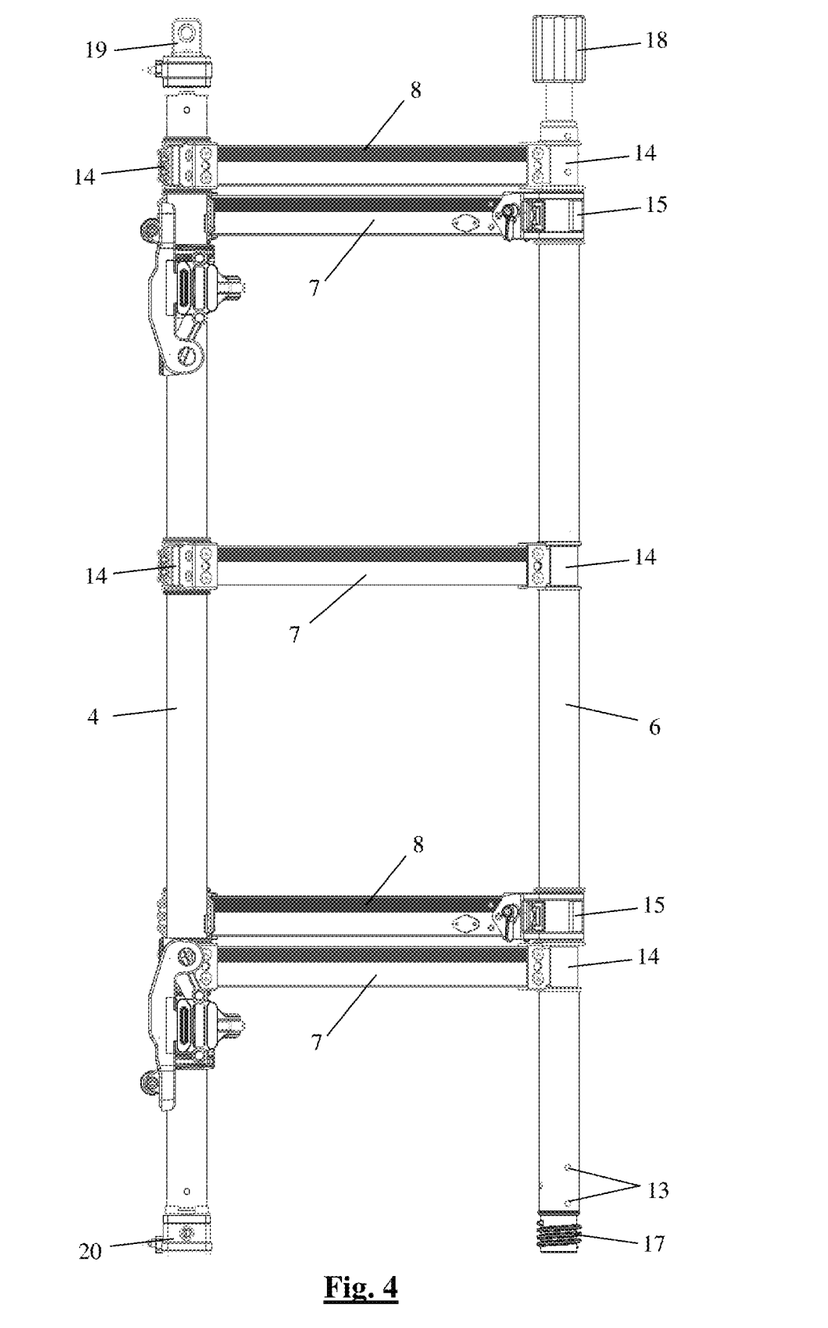
FIG. 4 shows a frame module from the support frame from FIG. 1 separately in side view.

The first longitudinal rod (4) and the second longitudinal rod (5) are double-walled. In the illustrated embodiments, these longitudinal rods (4, 5), to this end, comprise an internal tube (10) which extends virtually along the length of this longitudinal rod (4, 5). Several coupling pieces (12) are arranged over this internal tube (10). By means of these coupling pieces (12), several outer tubes (11) of every longitudinal rod (4, 5) are attached around the internal tube (10) of this longitudinal rod (4, 5). At the ends of a cylindrical base body, these coupling pieces (12) to this end comprise laterally facing flanges (21) and edges (22) which are raised with respect to these flanges (21). This raised edge (22) is fitted in the respective external tube (11) until the external tube (11) touches the laterally facing flange (21), as can be seen in FIG. 3. At the ends of the longitudinal rods (4, 5), the outer tubes (11) are pinned to the internal tube (10) by means of pins (13), as can be seen in FIGS. 2 and 4.

The internal tube (10) and the external tube (11) may be made from, for example, an aluminium or a composite comprising carbon fibres. The coupling pieces (12) may be made of, for example, a plastic.

The first longitudinal rod (4), the second longitudinal rod (5) and the cross beams (9, 23) as such may form a frame module (3). However, in addition, the frame modules (3) may still comprise additional elements, such as additional rods (6, 7, 8). Thus, the frame modules (3) may be configured to form a three-dimensional lattice-forming structure, as is illustrated in FIGS. 1 and 4-7.

The coupling pieces (12) form narrowings (16) in the first longitudinal rod (4) and the second longitudinal rod (5). Around the coupling pieces (12) of the first longitudinal rod (4), fastening clamps (14) are arranged, by means of which first cross bars (7) are pivotably attached to the first longitudinal rod (4). At the other end of these first cross bars (7), second fastening clamps (14) are arranged which are arranged around coupling pieces (12) of an analogous third longitudinal rod (6) in order to pivotably attach these first cross bars (7) to this third longitudinal rod (6). In this case, the first cross bars (7) are arranged at an intermediate distance apart in such a way that, together with the first longitudinal rod (4) and the third longitudinal rod (6), they form a ladder, as can be seen in FIG. 4. A support frame (1) which has been erected by means of these can then be climbed by means of this ladder.

Analogously, fastening clamps (14) are arranged around the coupling pieces (12) of the second longitudinal rod (5), by means of which second cross bars (8) are pivotably arranged on the second longitudinal rod (5). At the other end, open second fastening clamps (15) are arranged on these second cross bars (8) which can be click-fitted around coupling pieces (12) of the third longitudinal rod (6) in order to releasably pivotably attach the second cross bars (8) to the third longitudinal rod (6).

Figure 5:
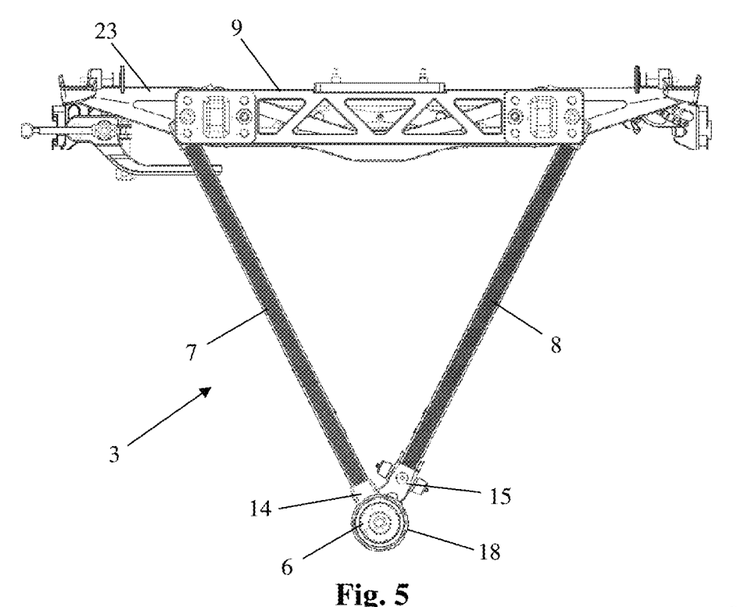
FIG. 5 shows a frame module from the support frame from FIG. 1 separately in top view.
Figure 6:
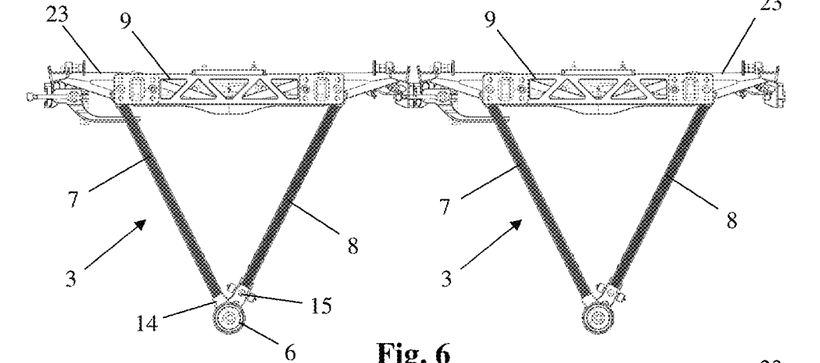
FIG. 6 shows a top view of the way in which several frame modules from the support frame from FIG. 1 can be mutually coupled according to a first method.
Figure 7:
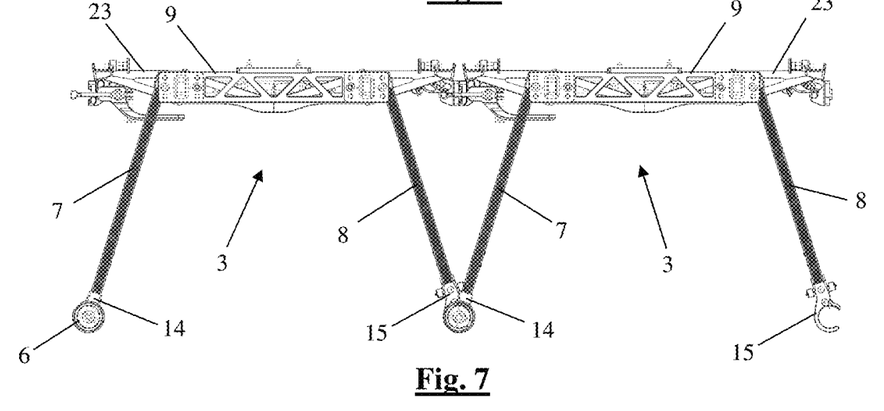
FIG. 7 shows a top view of the way in which several frame modules from the support frame from FIG. 1 can be mutually coupled according to a second method.

If the second fastening clamps (15) on the second cross bars (8) are released, the cross bars (7, 8) and the third longitudinal rod (6) can be folded as far as against the frame of the first longitudinal rods (4, 5) and the cross beams (9, 23), so that the frame module (3) is transportable in a compact way. At the location where a wall is desired, the cross bars (7, 8) and the third longitudinal rod (6) can be folded away from the frame of the first longitudinal rods (4, 5) and the cross beams (9, 23) in order to form a three-dimensional structure. The second fastening clamps (15) on the second cross bars (8) can then be click-fitted to either the third longitudinal rod (6) of the same frame module (3), as is illustrated in FIGS. 5 and 6, or may be click-fitted to the third longitudinal rod (6) of an adjacent frame module (3), as is shown in FIG. 7.

In order to erect a wall comprising different frame modules (3), the respective longitudinal rods (4, 5, 6) are configured to be mutually couplable, so that various such frame modules (3) can be attached one above the other.

To this end, the first longitudinal rod (4) and the second longitudinal rod (5) are provided with a pin (19) at their top side and with a corresponding hole (20) at their bottom side. The pin (19) of these longitudinal rods (4, 5) is fittable in the hole (20) of corresponding longitudinal rods (4, 5) in order to attach these longitudinal rods (4, 5) one above the other.

At the bottom, the third longitudinal rod (6) is provided with an external screw thread (17). At its top side, a fastening sleeve (18) with a corresponding internal screw thread (18) is provided. This fastening sleeve (18) of the third longitudinal rod (6) may thus be screwed onto the corresponding screw thread (17) of a third longitudinal rod (6) arranged above the latter in order to attach these third longitudinal rods (6) one above the other.

By means of these longitudinal rods (4, 5, 6), a support frame (1) can rest on a surface, as can be seen in FIG. 1. Cables may be attached to the cross beams (9) of the top frame modules (3) in order to be able to lift the assembly.

Figure 8:
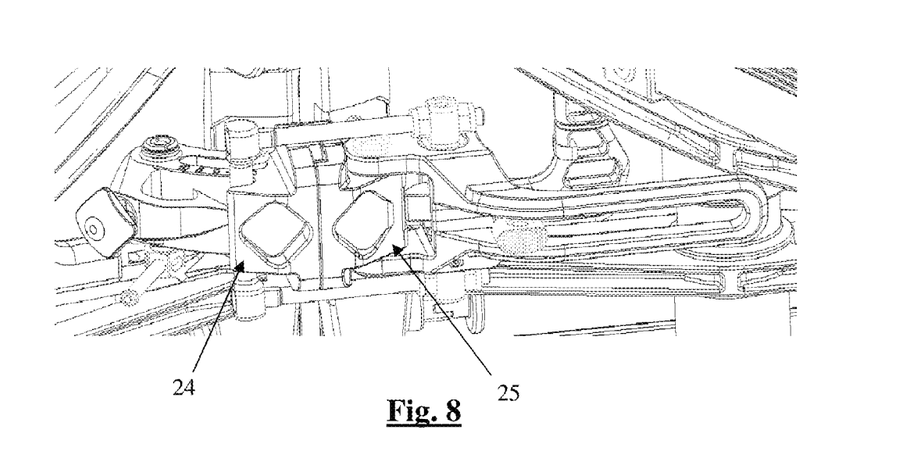
FIG. 8 shows a perspective view of attachment means for mutually coupling two frame modules from a support frame according to the present invention.
Figure 9:
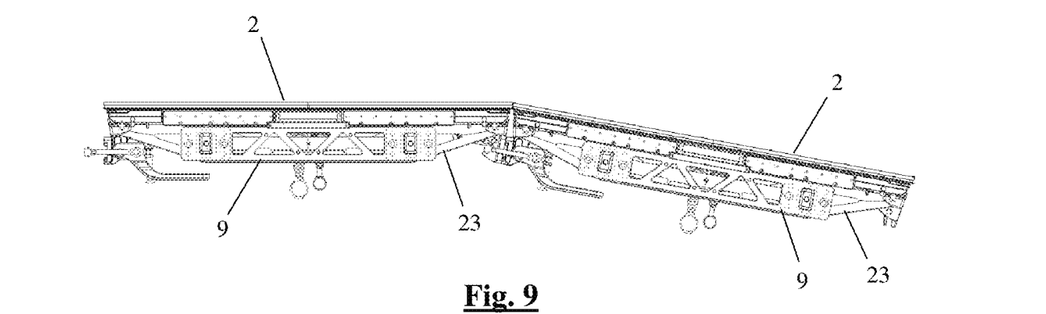
FIG. 9 shows a top view of the way in which two frame modules can be mutually coupled in a convex way by means of the attachment means from FIG. 8.
Figure 10:
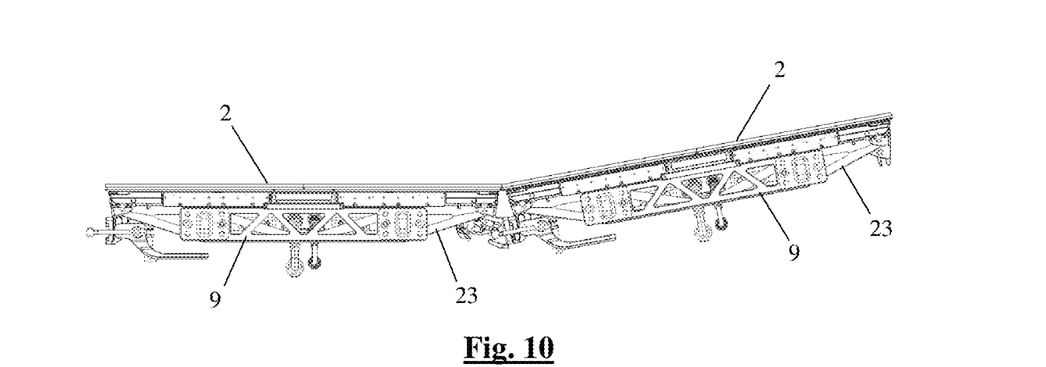
FIG. 10 shows a top view of the way in which two frame modules can be mutually coupled in a concave way by means of the attachment means from FIG. 8.

In order to configure various frame modules (3) in such a way that they are also laterally mutually couplable so as to be able to erect a wall, each frame module (3) comprises first attachment means (24) on a first lateral side and second attachment means (25) on a second lateral side. The first attachment means (24) of a first frame module (3) are adjustably attachable to the attachment means (25) of a second frame module (3) in such a way that the first frame module (3) and the second frame module (3) are mutually couplable at different angles with respect to each other by means of these attachment means (24, 25), as can be seen in FIGS. 8 to 10.

At less than 10 kg per square metre of frame, walls up to 30 metres high can be erected using the frame modules (3) illustrated in FIG. 1, this both for indoor and outdoor use.

The invention claimed is:

1. Modular support frame for supporting LED panels, comprising several frame modules, wherein at least one of these frame modules is configured to support an LED panel, and comprises at least one longitudinal rod of a fixed length, wherein the longitudinal rod is at least partially double-walled.

2. Support frame according to claim 1, wherein the longitudinal rod comprises an internal tube and comprises at least one external tube which is arranged around the internal tube.

3. Support frame according to claim 2, wherein the external tube is pinned to the internal tube by means of pins.

4. Support frame according to claim 1, wherein the frame module comprising the longitudinal rod comprises a second longitudinal rod which is at least partially double-walled and which is arranged at an intermediate distance from the first longitudinal rod in order to support the LED panel.

5. Support frame according to claim 4, wherein the frame module comprising the said longitudinal rods comprises at least one first cross bar which is pivotably attachable or attached to the first longitudinal rod, comprises at least one second cross bar which is pivotably attachable or attached to the second longitudinal rod and comprises a third longitudinal rod which is pivotably attached or attachable to the first cross bar and is pivotably attached or attachable to the second cross bar.

6. Support frame according to claim 5, wherein, in addition to the frame module comprising the longitudinal rods and the cross bars, at least one second frame module of the frame modules is configured to support an LED panel, wherein this second frame module comprises a first longitudinal rod, a second longitudinal rod and a third longitudinal rod, comprises at least one first cross bar which is pivotably attachable or attached to the first longitudinal rod of this second frame module and pivotably attachable or attached to the third longitudinal rod of this frame module and comprises at least one second cross bar which is pivotably attachable or attached to the second longitudinal rod of this second frame module and which is pivotably attachable to the third longitudinal rod of the former frame module comprising the longitudinal rods and the cross bars, when this former frame module is arranged adjacent to the second frame module.

7. Support frame according to claim 5, wherein the first longitudinal rod, at the location of every attachment to a cross bar, comprises a constriction.

8. Support frame according to claim 7, wherein the first longitudinal rod at the location of every attachment to a cross bar is single-walled.

9. Support frame according to claim 8, wherein the longitudinal rod comprises an internal tube and comprises at least one external tube which is arranged around the internal tube, and wherein, at the location of every attachment to a cross bar, a coupling piece is arranged around the internal tube of the first longitudinal rod for attaching the cross bar to the first longitudinal rod.

10. Support frame according to claim 9, wherein each external tube is attached to the internal tube by means of a said coupling piece.

11. Support frame according to claim 5, wherein each frame module comprises several first cross bars, wherein these first cross bars are arranged at such an intermediate distance apart that they, together with the first longitudinal rod and the third longitudinal rod of this frame module, form a ladder.

12. Support frame according to claim 1, wherein several frame modules of the said frame modules comprise at least one longitudinal rod and in that longitudinal rods of different frame modules are mutually couplable in order to couple adjacent panels.

13. Support frame according to claim 1, wherein at least a part of the rods is made of an aluminium or a composite comprising carbon fibres.

14. Support frame according to claim 1, wherein each frame module comprises first attachment means and comprises second attachment means, wherein the first attachment means of a first frame module are adjustably attachable to the second attachment means of a second adjacent frame module, so that the first frame module and the second frame module are mutually couplable at different angles with respect to each other by means of these attachment means.

15. LED wall, comprising a support frame and several LED panels, wherein the support frame is a support frame according to claim 1.

16. The modular support frame of claim 1, wherein the at least one longitudinal rod is non-telescopic.

17. The modular support frame of claim 1, wherein the at least one longitudinal rod comprises walls that are fixedly arranged with respect to each other.

18. The modular support frame of claim 2, wherein the at least one external tube is fixed with respect to the internal tube.

19. The modular support frame of claim 1, wherein the at least one frame module comprises a plurality of longitudinal bars that are linked with a plurality of crossbars and are configured to be attached to the rear of LED panel.

* * * * *